US008583753B1

(12) United States Patent
Bhagwatula et al.

(10) Patent No.: US 8,583,753 B1
(45) Date of Patent: Nov. 12, 2013

(54) SERVICE ADVERTISEMENTS FOR A NETWORK

(75) Inventors: Praveen Bhagwatula, Cary, NC (US); Sanjeev Rampal, Cary, NC (US); Charles Allen Carriker, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 962 days.

(21) Appl. No.: 11/852,266

(22) Filed: Sep. 7, 2007

(51) Int. Cl.
*G06F 15/16* (2006.01)

(52) U.S. Cl.
USPC .......................................... 709/208; 709/217

(58) Field of Classification Search
USPC .......................................................... 709/208
See application file for complete search history.

(56) References Cited

U.S. PATENT DOCUMENTS

| | | | |
|---|---|---|---|
| 7,647,427 B1* | 1/2010 | Devarapalli | 709/245 |
| 7,849,150 B2* | 12/2010 | Loeebbert et al. | 709/208 |
| 2003/0088698 A1* | 5/2003 | Singh et al. | 709/239 |
| 2003/0189898 A1* | 10/2003 | Frick et al. | 370/227 |
| 2005/0129024 A1* | 6/2005 | Fisher et al. | 370/395.1 |
| 2006/0109802 A1* | 5/2006 | Zelig et al. | 370/258 |
| 2007/0076719 A1* | 4/2007 | Allan et al. | 370/392 |
| 2007/0165518 A1* | 7/2007 | Bruckman et al. | 370/222 |

OTHER PUBLICATIONS

RAD Data Communications, "Resilient FAS Ethernet Ring Technology: Supports Combined Voice, Legacy Data and LAN Traffice over an Enterprise Metro Area Ethernet Ring", RAD data communication, White Paper Nov. 2002, USA & Israel, (Nov. 2002),1-13.
Cisco Configuration Guide, "Configuring Link Aggregation; Understanding Link Aggregation", Cisco ONS 15454 and Cisco ONS 15454 SDH Ethernet Card Software Feature and Configuration Guide, R8.0, Feb. 2007, Chap 10 pp. 10:1-10:14.
"Overview of Routing Between Virtual LANs", Cisco IOS Configuration Guide Master Index, Release 12.0, XC-31, 2007, 1-6
Bernstein, Marc "VLAN Design for IPTV Networks; White Paper", Juniper Networks, USA, (May 2006),1-12.
Gambiroza, V. et al., "The IEEE 802.17 Media Access Protocol for High-Sped Metropolitan Area Resilient Packet Rings", IEEE, 802.17 Media Access Protocol, (2003),1-8.

* cited by examiner

*Primary Examiner* — Karen Tang

(57) ABSTRACT

In one example embodiment, a method may include receiving a service advertisement message from an advertising node via a ring-based network, determining a service map based on the received service advertisement message, and transmitting data to the advertising node. The service advertisement message may include an address of the advertising node and a service ID for one or more services. The service map may indicate an association between the address of the advertising node and the one or more service IDs. The transmitting data to the advertising node may include transmitting data for at least one of the services to the advertising node based on the service map via the ring-based network.

18 Claims, 7 Drawing Sheets

SERVICE ADVERTISEMENTS FOR A NETWORK

TECHNICAL FIELD

The present disclosure relates generally to service advertisements and service maps for networks.

BACKGROUND

Networks may include virtual local area networks (VLANs) which allow virtual partitioning of a network without modifying the physical connections within the network. A VLAN may typically be a switched network that is logically segmented or partitioned, rather than based on a physical or geographical basis. Nodes within the network may each be members of one or more VLANs. Membership of the nodes within each VLAN may change, requiring updates to the network.

VLAN switching may commonly be accomplished through frame tagging where traffic originated in a particular virtual LAN may carry a specific VLAN identifier (VLAN ID). The VLAN ID may allow switching devices to make forwarding decisions for the packet.

However, communicating updated VLAN membership across a network may create significant overhead. Also, the number of different VLAN IDs may be quite limited, e.g., 4095 different VLANs may be used in some cases.

DESCRIPTION OF EXAMPLE EMBODIMENTS

Overview

According to one general aspect, a method may include receiving a service advertisement message from an advertising node via a ring-based network, determining a service map based on the received service advertisement message, and transmitting data to the advertising node. The service advertisement message may include an address of the advertising node and a service ID for one or more services. The service map may indicate an association between the address of the advertising node and the one or more service IDs. The transmitting data to the advertising node may include transmitting data for at least one of the services to the advertising node based on the service map via the ring-based network.

According to another general aspect, an apparatus may include a controller. The controller may be configured to receive a service advertisement message from an advertising node via a point-to-point broadcast media network and determine a service map. The service advertisement message may include an address of the advertisement node and a service ID for one or more services. The service map may be determined based on the received service advertisement message. The service map may indicate an association between the address of the advertising node and the one or more service IDs.

According to another general aspect, a method may include transmitting a service advertisement message from an advertising node via a point-to-point broadcast media network, and receiving data for a first service via the point-to-point broadcast media network based on the service advertisement message. The service advertisement message may include an address of the advertising node and a service ID for one or more services including the first service for which the advertising node is associated. Each of the service IDs may include a VLAN ID identifying a virtual LAN and a service domain ID identifying a service domain.

Figure 1:
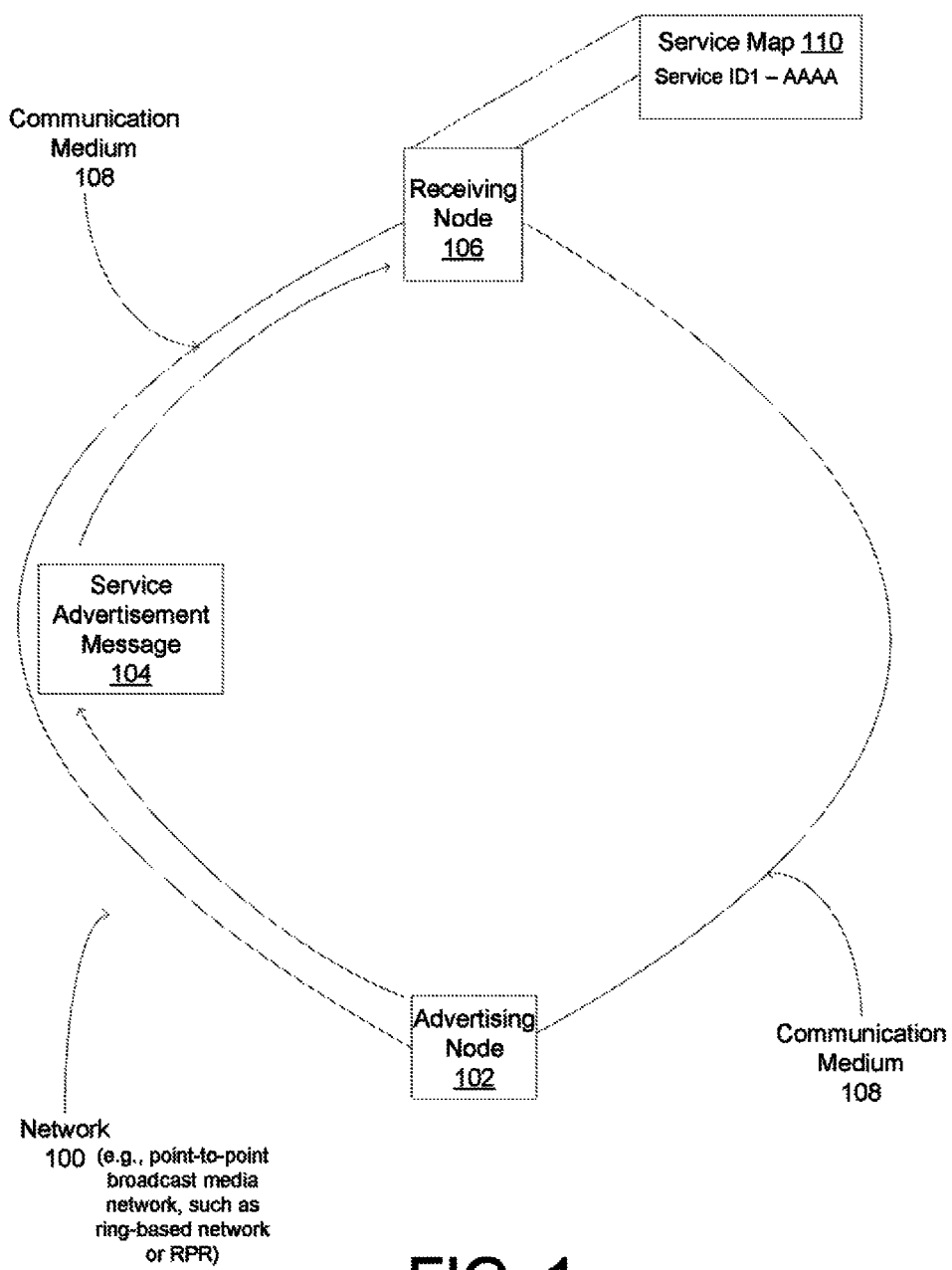
FIG. 1 is a block diagram illustrating a network including an advertising node sending a service advertisement message to a receiving node according to an example embodiment.

FIG. 1 is a block diagram illustrating a network 100 according to an example embodiment. Network 100 may include a number of different network nodes coupled together via a communication medium 108. The network 100 may include, for example, a point-to-point broadcast media network, such as a ring-based network. The ring-based network may include, for example, a Resilient Packet Ring network or other network. These are some example networks and other types of networks may be used.

The communication medium 108, through which messages may be sent between the nodes 102, 106, may be coupled by a point-to-point connection, may include optical fiber, copper wire, twisted pair, coaxial cable, or an air (or wireless) interface, according to example embodiments.

In this example network, the network nodes may include an advertising node 102 and a receiving node 106. Each of the nodes (e.g., nodes 102, 106) of network 100 may be members of or associated with one or more service IDs. Each service ID may identify a service, for example. According to an example embodiment, each service ID may identify a packet delivery service between nodes, packets for (or from) a specific application, a specific data connection or session between nodes, may identify a specific type of traffic such as, audio, video, IP television (IPTV) channel or program, or other packet service, or may identify an association or relationship between nodes (such as part of a service or members of a virtual network, VLAN or other relationship), as some examples. An example of a service ID may include a virtual local area network (VLAN) ID. This is merely an example, and other types or formats of service IDs may be used.

While two nodes 102, 106 are included in the network 100 shown in FIG. 1, any number of nodes may be included. The nodes 102, 106 may include line cards, switches, routers, or other network devices, and may be capable of sending and receiving messages across network 100. Each node may have (or be identified by) an address, such as a medium access control (MAC) address, or a RPR (Resilient Packet Ring) MAC address, according to example embodiments.

The nodes 102, 106 may send or broadcast service advertisement messages 104 to other nodes on network 100 in order to indicate or advertise their membership or association with one or more service IDs. For example, an advertising node may send a service advertisement to update their VLAN membership to other nodes within the network 100 (e.g., indicate membership of one or more VLANs or other service IDs). The service advertisement messages 104 may be sent, for example, periodically, e.g., every 30 ms (milliseconds) or other time period, according to an example embodiment.

For example, one or more of the nodes, such as the advertising node 102, may send a service advertisement message 104 via network 100 to one or more nodes coupled to the network. The service advertisement message 104, which is shown in greater detail in FIG. 4A, may include an address of the advertising node 102, such as the MAC address and/or the RPR (Resilient Packet Ring) MAC address, and a service ID for one or more services for which the advertising node 102 is a member or may be associated with. The service advertisement messages 104 may each include an updated list of service ID(s) that identify services of which the advertising node is a member or is associated with. In an example embodiment, each service ID may include a VLAN ID identifying a VLAN of which the advertising node 102 is member. Each of the service IDs included in the service advertisement message 104 may additionally or alternatively include a service domain ID, according to an example embodiment.

The receiving node 106 may receive the service advertisement message 104, and any subsequent service advertisement messages 104, according to an example embodiment. Based on the service advertisement message 104, the receiving node 106 may determine or generate a service map 110. The service map 110 may indicate an association between the address of the advertising node 102 and the service ID(s) of which the advertising node 102 may be associated. The service map 110 may indicate associations between the address of the advertising node 102, and a VLAN ID and/or a service domain ID, according to an example embodiment. An example service map 110 is shown in greater detail in FIG. 4B.

Thus, in the example illustrated in FIG. 1, advertising node 102 may have a RPR MAC address of AAAA. Advertising node 102 may send a service advertisement message 104 that includes the MAC address of node 102 (AAAA) and the one or more service IDs of which node 102 is a member or associated with (e.g., service ID1). Upon receipt of the service advertisement message 104, node 106 may generate or determine, based on the received service advertisement message(s), a service map 100. In this example, the service map would include an association between Service ID1 and address AAAA, as shown. Although service map 110 includes only one entry, it may include entries for any number of service IDs or addresses.

Receiving node 106, as an example, may receive service advertisement message from different nodes on network 100, and for different service IDs. In an example embodiment, receiving node may generate a service map and keep track of other members of service IDs of which it is also a member or associated with. Other associations (for other service IDs of which node 106 is not a member or associated with) may not be of interest to node 106, and thus, may be discarded or not necessarily included in service map 110, for example.

In an example embodiment, a packet may be received at receiving node 106 (e.g., via another network, not shown). The received packet may include a service ID, such as a VLAN ID. The receiving node may match the VLAN ID to the service IDs (each of which may include a VLAN ID) in service map 110. If a match is found, for example, the receiving node may then append a header to the packet that includes the associated RPR MAC address and then forward the packet to the destination node (or associated address AAAA) via network 100. For example, a packet may arrive at receiving node via an Ethernet network, not shown, that includes service ID1. Based on service map 110 (indicating an association between service ID1 and address AAAA), node 106 may then forward the packet via network 100 to node 102 (having address AAAA).

Although not shown in FIG. 1, receiving node 106 may also send out service advertisement messages, and advertising node 102 may also determine or generate a service map based on received service advertisement messages. Thus, each node in network 100 may send out service advertisement messages, and may also determine or generate a service map based on received service advertisement messages from other nodes in network 100.

In an example embodiment, the network 100 may be a point-to-point broadcast media network, such as a ring-based network or a RPR network. In such a case, for example, there may be only two nodes within network 100 that may be a member of, or associated with, the same service ID (or VLAN ID in an example embodiment).

The advertising node 102 may also send updated service advertisement messages 104 to the receiving node 106, to provide updated information regarding the service IDs of which the advertising node is a member or is associated with, as these may change over time. The updated service advertisement messages 104 may be sent periodically, according to an example embodiment. The receiving node 106 may determine an updated service map 110 indicating an updated association between the address of the advertising node 102 and the one or more service ID(s) based on the updated service advertisement messages 104.

In addition, the receiving node 106 may use a timeout feature to maintain current or up to date information (service ID-address associations) within service map 110, allowing stale entries in service map 110 to be deleted, e.g., deleting or removing entries that are older than a timer value or threshold time. For example, a timer may be initialized to a timer value and start decrementing after a service ID-address association have been received via a service advertisement message, and the timer may be reinitialized when an updated message for this association is received. In one example embodiment, this service ID-address association may remain in the service map 110 so long as updated service advertisement messages are received at least every timer value. For example, if the timer value counts down to zero without a new or updated service advertisement message with the service ID and address being received, then this service ID-address association entry may, for example, be deleted (as stale) from the service map 110. This is merely an example, and different techniques may be employed to delete or remove stale entries from the service map 110.

In addition, the service map may be used to communicate (transmit and/or receive) data for one or more of the services. The receiving node 106 may, for example, transmit data associated with one or more of the services (identified by the service IDs) to nodes via the network 100. For example, if the service ID includes a VLAN ID, then receiving node may receive a packet (e.g., via an Ethernet or other network, not shown) having a VLAN ID, e.g., indicating VLAN1 (VLAN1 is an example service ID or VLAN ID). The receiving node 106 may then lookup or match the VLAN1 (VLAN ID) for the packet in its service map 110, and identify the associated RPR (or ring-based network) MAC address, e.g., address AAAA. A header may be appended to the packet to create an RPR frame. The header may include the address AAAA as the destination address, and may include the RPR address of receiving node 106 as a source address. This RPR frame, having the Ethernet or other packet encapsulated therein, may then be transmitted or sent via network 100 and is received by advertising node 102. Because the destination address on the RPR frame matches the address (AAA) of the advertising node 102, the RPR frame may be removed from the ring-based network (or RPR network) by node 102, and the RPR header is stripped off, and the Ethernet packet may be forwarded by node 102 via another network (e.g., Ethernet network) not shown, e.g., based on the VLAN tag or service ID. This is merely one example, and the service map may be used for other operations as well.

Figure 2:
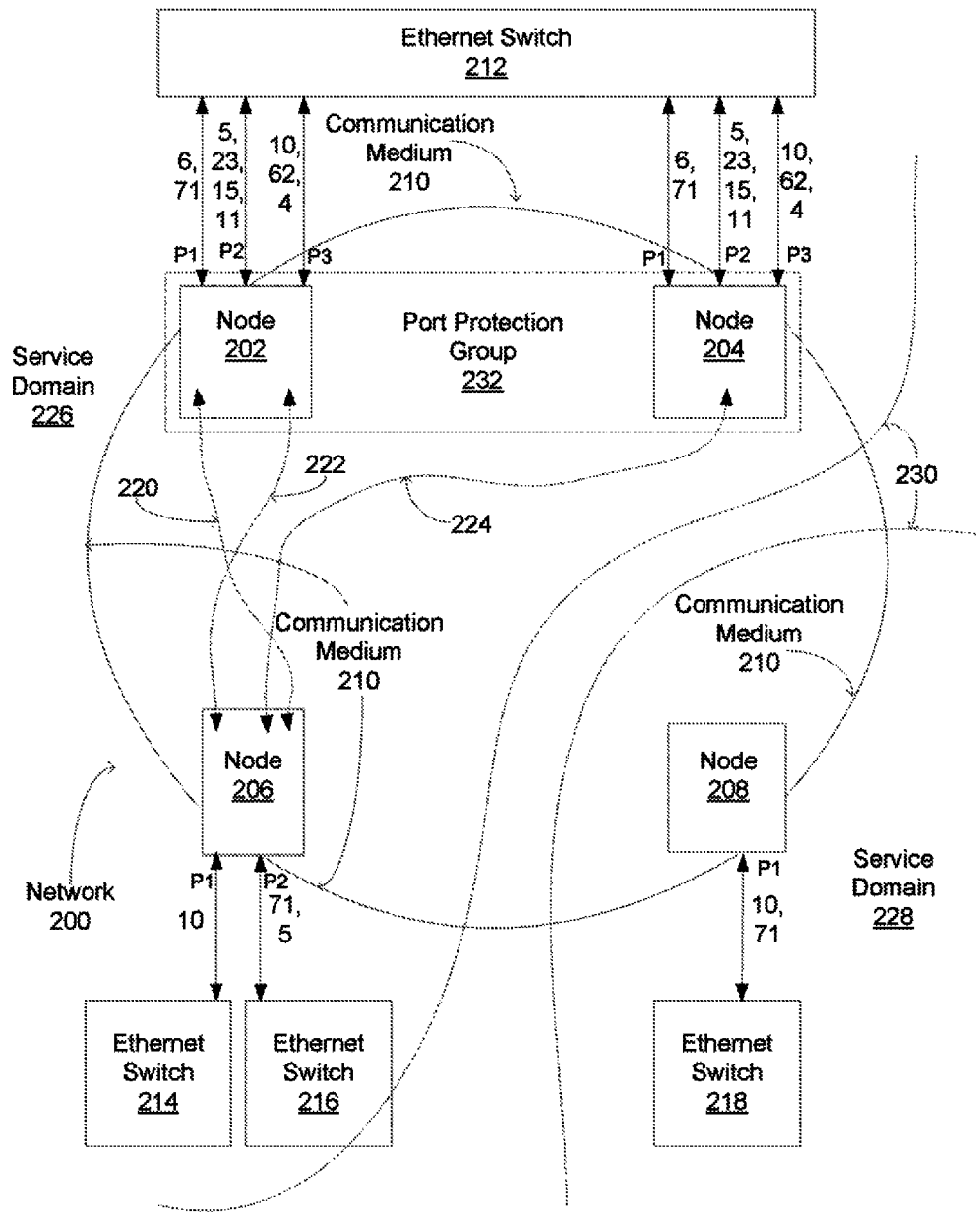
FIG. 2 is a block diagram illustrating a network including four nodes with their respective VLAN and service domain memberships, according to an example embodiment.

FIG. 2 is a block diagram showing a network 200 including four network nodes 202, 204, 206, and 208. The network 200 may include a ring-based network, such as an RPR (resilient packet ring) network, any point-to-point service over broadcast media network, or other network. A communication medium 210, through which the nodes 202, 204, 206, 208 may transmit messages, may include optical fiber, copper wire, twisted pair, coaxial cable, or an air interface, or other medium, according to example embodiments.

The network nodes 202, 204, 206, 208 may be capable of sending and receiving messages within or over the network 100. The nodes 202, 204, 206, 208 may each be line cards, switches or other network devices, and may, for example, be coupled to or plugged into one or more routers or switches, such as Gigabit Ethernet switches, through one or more ports. In the example embodiment shown in FIG. 2, each node may be coupled to an Ethernet switch via one or more ports. FIG. 2 illustrates an example network configuration that may be used to assist in describing various techniques, embodiments or features, and a variety of other network configurations or arrangements may be used as well.

According to an example embodiment, the network 200 may be partitioned based on service domains. For example, a service ID may include both a service domain ID (identifying a service domain) and a VLAN ID (identifying a VLAN). In one example embodiment, each node in network 200 may belong (or be associated with, or a member of), for example, one service domain, although the embodiments are not limited thereto. Also, in an example embodiment, the different VLAN IDs may be reused in different service domains, within the same network. Therefore, by using a service ID (or virtual network ID) that may include both a service domain ID and a VLAN ID, the number of different services or virtual networks that may be used or assigned in a network may be significantly increased (e.g., increased beyond the number of different VLANs provided by a fixed size VLAN ID field, such as only 4095 VLANs).

The nodes 202, 204, 206, 208 may forward or may be capable of forwarding or routing packets or frames between another network (such as an Ethernet network) and network 200 (which may be, for example a ring-based network or RPR network). For example, a node 202, 204, 206, 208 may receive a packet from a network such as an Ethernet network. The packet may include a service ID. Each of nodes 202, 204, 206, 208 may determine, based on their own service map, an address associated with the service ID for the received packet. Each node 202, 204, 206, 208 may append to the packet a header including the address of the address associated with the service ID (as a destination address), and then send or transmit the packet with appended header via network 200 (which may be an RPR network as an example).

Similarly, each node 202, 204, 206, 208 may receive, from another node 202, 204, 206, 208 via network 200, a packet including the appended header and a body including a service ID. For example, node 202, may receive a packet that includes an RPR header including an address (e.g., RPR MAC address) of node 202. Based on this RPR address of the received RPR frame, node 202 may receive and possibly remove the RPR frame from network 200, and strip or remove the header from the packet, and then forward or transmit the packet via another network such as an Ethernet network (e.g., to Ethernet switch 214 or 216) based on the service ID or VLAN ID.

The network nodes of network 200 (e.g., nodes 202, 204, 206 and 208) may be divided into different service domains, according to an example embodiment. As shown in FIG. 2, lines 230 may indicate a boundary between a service domain 226 (e.g., including nodes 202, 204 and 206), and a service domain 228 (including node 208), for example. Various VLAN IDs may be reused or duplicated in both service domain 226 and service domain 228 (and any other service domains). This is an example that illustrates multiple service domains, and other configurations and service domains may be provided.

Each of nodes 202, 204, 206 and 208 may include one or more ports through which the node may be coupled to another device, such as to an Ethernet switch, according to an example embodiment. For example, node 202 may be coupled to Ethernet switch 212 via port p1, port p2 and port p3. Node 204 may be coupled to Ethernet switch 212 via ports p1, p2 and p3. Node 206 may be coupled to Ethernet switch 214 via port p1, and to Ethernet switch 216 via port p2. Nodes 202, 204 and 206 may be part of service domain 226, for example. Node 208 (part of service domain 228) may be coupled to switch 218 via port p1.

Each port which couples a node 202, 204, 206, 208 to an Ethernet switch 212, 214, 216, 218 may be associated with one or more VLANs. In the example embodiment shown in FIG. 2, port p1 of node 202 may be associated with VLANs 6 and 71, port p2 of node 202 may be associated with VLANs 5, 23, 15, and 11, and the port p3 of Node 202 may be associated with VLANs 10, 62, and 4. Thus, when active, node 202 may be, for example, a member of, or associated with the following VLANs: 6, 71, 5, 23, 15, 11, 10, 62, and 4.

Ports p1, p2 and p3 of node 204 may be associated with the same VLANs as ports p1, p2 and p3, respectively, as node 202. In an example embodiment, nodes 202 and 204 may be part of a port protection group 232 in which one of nodes 202/204 may be active, and the other may be in standby mode or inactive. If a failure occurs in the active node, then the standby node of the port protection group may be enabled, for example. Thus, when active, node 204 may be, for example, a member of, or associated with the following VLANs: 6, 71, 5, 23, 15, 11, 10, 62, and 4. Alternatively, both nodes 202 and 204 may operate at the same time. In this manner, since the nodes (or cards) 202 and 204 may provide redundancy, this may be considered as a node (or card) protection group, since one node may be substituted (or activated) for another.

In another alternative embodiment, the port protection group 232 (including ports for both nodes 202 and 204) may provide port redundancy, allowing different ports on nodes 202 and 204 to be active (e.g., port p1 active on node 202, and ports p2 and p3 active and node 204, or vice versa), with the other ports remaining in standby or inactive mode. Thus, the redundancy may be provided at the port level, rather than the node (or card level), for example. For example, nodes 202 and 204 may be RPR (or ring-based network) line cards coupled to switch 212. Three ports, including ports p1, p2 and p3, may be active at a time, between nodes 202 and 204. In an example embodiment, there may be one service domain per RPR (or node) port per node.

For example, ports p1 and p3 may be active on node 202, and node 202 may therefore send service advertisement messages via network 200 indicating that node 202 is a member of or associated with VLANs 6, 71, 10, 62 and 4. Likewise, port p3 of node 202 may be inactive at this time (e.g., as a backup or standby port). In this example, port p2 of node 204 may be active, and node 204 may therefore send service advertisement messages via network 200 indicating that node 204 is a member of or associated with VLANs 5, 23, 15, and 11. At this time, ports p1 and p3 of node 204 may be inactive or in standby mode.

In response to these service advertisement messages from nodes 202 and 204, node 206 may determine or generate a service map, e.g., to identify the other corresponding node that is a member of the VLANs or service IDs that are of interest to node 206. The VLANs of interest to node 206 may include at least, for example, the VLANs or service IDs of which node 206 is a member (e.g., VLANs 10, 71 and 5). Thus, for example, the service map generated by node 206, based on messages from nodes 202 and 204 may include the following (this is only one example):

[address of node 202]—VLANs 10, 71
[address of node 204]—VLAN 5

The service map for node 206 (and other node's service maps) may change over time. The other nodes coupled to network 200 may similarly determine or generate their own service maps. Although not shown, there may be another node that is part of service domain 228 that may also be a member or VLAN 10 and/or 71 (node 208 may list such a node in its service map). However, node 208 is not listed in the service map for node 206 for VLANs 10 and 71, since node 208 is in a different service domain (service domain 228), vs. service domain 226 for node 206. Thus, for example, node 206 may receive service advertisement messages from node 208, but node 206 may typically ignore these messages as they would identify a different service ID (combination of service domain ID and VLAN ID, for example).

Referring to FIG. 2, lines 220, 222 and 224 may represent the logical service for VLANs 10, 71 and 5, between the member (or associated) nodes. For example, line 220 may represent the logical service provided between node 206 and node 202 for VLAN 71. Line 222 may represent the logical service provided between node 206 and node 202 for VLAN 10. And, line 224 may represent the logical service provided between node 206 and node 204.

If a failure or problem occurs on one of the ports, then the standby port on the other node of the port protection group 232 may be activated. For example, port p1 on node 202 may fail. In response, port p1 on node 204 may be activated. This may cause new service advertisement messages from both nodes 202 and 204 to be changed or updated to reflect the change in active ports. Node 202 may, for example, send an updated advertisement message that no longer lists VLANs 6 and 71 (reflecting that port 1 on node 202 is no longer active, and that node 202 is no longer a member of VLANs 6 and 71). Or node 202 may send a negative advertisement message indicating that node 202 is no longer a member of VLANs 6 and 71 (receiving node 206 may then delete this entry from the service map in response to either message). Likewise, node 204 may send an updated service advertisement message that now includes or lists VLANs 6 and 71 (for port p1), which indicates that node 204 is a member of or associated with VLANs 6 and 71 (e.g., replacing node 202 for these two VLANs). Thus, in response to receiving this updated service advertisement from node 204, node 206 (also a member of VLAN 10) may update its service map to indicate that node 204 (and not node 202) is now associated with VLAN 10, for example.

Figure 3A:
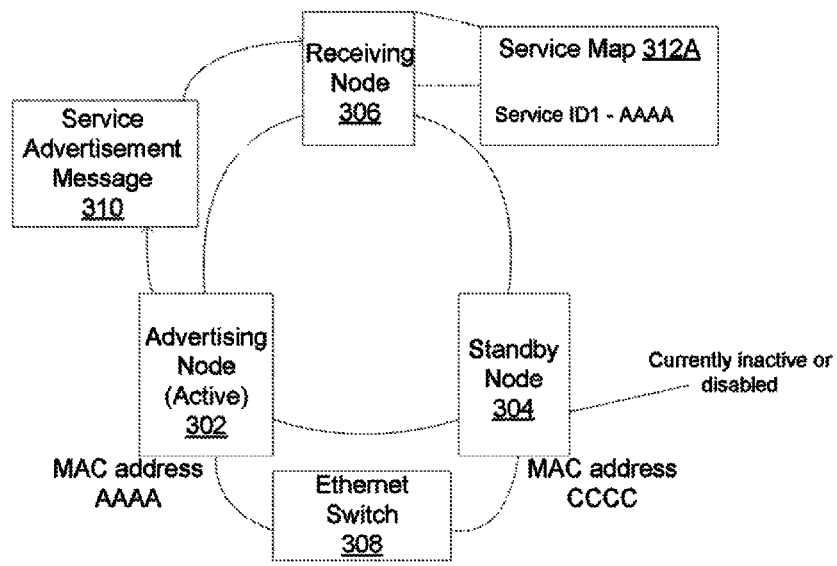
FIG. 3A is a block diagram illustrating an active advertising node, a standby node, and a receiving node according to an example embodiment.

FIG. 3A is a block diagram showing an active advertising node 302, a standby node 304, and a receiving node 306. The advertising node 302 and standby node 304 may be coupled to each other (such as by a card protection port) and to a common Ethernet switch 308, forming a port protection group, according to an example embodiment. In this example, the advertising node 302 is active, and the standby node 304 is inactive, receiving but not sending messages (other than acknowledgment messages); the dashed line between the standby node 304 and the Ethernet switch 308 indicates that the standby node 304 may not be communicating with the Ethernet switch 308 while the advertising node 302 is active.

While the advertising node 302 is active, the advertising node 302 may transmit a service advertisement message 310 to the receiving node 306. The service advertisement message 310 may be transmitted periodically. The service advertisement message 310 may be transmitted via a point-to-point broadcast media network or a ring-based network such as an RPR network, according to example embodiments. The service advertisement message 310 may include an address of the advertising node 302 and a service ID for one or more services for which the advertising node 302 is associated. The service ID may, for example, include a VLAN ID identifying a VLAN of which the advertising node 302 is a member. For example, node 302 may send a service advertisement message listing service ID1 (as being associated with the address of node 302, AAAA). Service ID1 is an example service ID, and AAAA is an example of the address of node 302.

The receiving node 306 may receive the service advertisement message 310 and determine a service map 312A based on the service advertisement message 310. The service map 312A may indicate an association between the address of the advertising node 302 (AAAA) and the service ID and/or services with which the advertising node 302 is associated. For example, service map 312A for node 306 may include an association between address AAAA (address of node 302) and service ID1, as shown in FIG. 3A, based on the service advertisement message from node 302. The receiving node 306 may send, to the address (AAAA) of the advertising node 302, data for the one or more services with which the advertising node 302 is associated based on the service map 312, and the advertising node 302 may receive the data.

The advertising node 302 may also send a "heartbeat" to the standby node 304. The heartbeat may include signals or data indicating that the advertising node 302 is still active. The heartbeat may, for example, be sent to the standby node 304 periodically through inter-card communication. The standby node 304 may receive the heartbeat, and may send an acknowledgment to the active node 302 in response to receiving the heartbeat. The standby node 304 may remain in an inactive state based on receiving the heartbeat, according to an example embodiment.

Figure 3B:
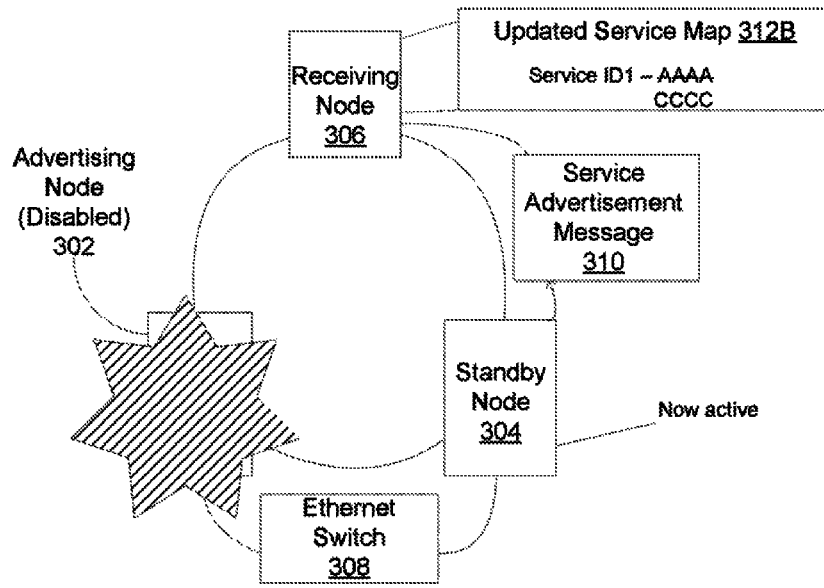
FIG. 3B is a block diagram illustrating a disabled advertising node, a standby node, and a receiving node according to an example embodiment.

FIG. 3B is a block diagram showing a disabled advertising node 302, the standby node 304, and the receiving node 306. In this example, the advertising node 302 has become disabled. The advertising node 302 may stop sending service advertisement messages to the receiving node 306, and may stop sending heartbeats to the standby node 304. The standby node 304 may determine that the advertising node 302 has become disabled based on not receiving heartbeats from the advertising node 302. The standby node 304 may become active based on determining that the advertising node 302 has become disabled. The standby node 304 may, upon becoming active, communicate with the Ethernet switch 308, as indicated by the solid line between the standby node 304 and the Ethernet switch 308. The standby node 304 may also send service advertisement messages 310 to the receiving node 306.

The active standby node 304 may send service advertisement messages 310 to the receiving node 306; the service advertisement messages 310 may be sent periodically, according to an example embodiment. The service advertisement messages 310 sent by the standby node 304 may include the same service ID(s) as the service advertisement messages 310 sent by the advertising node 302, but may include a different address to reflect the address associated with the standby node 304, according to an example embodiment. For example, node 304 may send a service advertisement message listing service ID1.

The receiving node 306 may receive the service advertisement message 310 from the standby node 304. The receiving node 306 may determine an updated service map 312 based on the received service advertisement message 310. The updated service map 312 may indicate an association between the address of the standby node 304 and the one or more services (or service IDs). For example, as shown in FIG. 3B, receiving node 306 update its service map 312B by deleting (or removing) address AAAA (address of node 302), and inserting or adding address CCCC (address of node 304), as being associated with service ID1, based on the updated service advertisement from node 304. Thus, the service map 312B has been updated to indicate that node 304 (address CCCC) is now associated with or a member of service ID1, and that node 302 is not.

For example, because this may be a point-to-point network, there may be only one other node that is a member of a VLAN or service ID. Thus, for example, when node 306 received the updated service advertisement from node 304 listing service ID1, the node 306 may then add address CCCC and remove address AAAA as being associated with service ID1, since only one of nodes 302 and 304 may be a member or associated with service ID1, according to an example embodiment. For example, the most recently received service advertisement message may control the entries in a service map. The receiving node 306 may now send data associated with service ID1 to the address (CCCC) of the standby node 304 based on the updated service map 312B. Thus, the standby node 304 may replace the advertising node 302, according to an example embodiment.

Figure 4A:
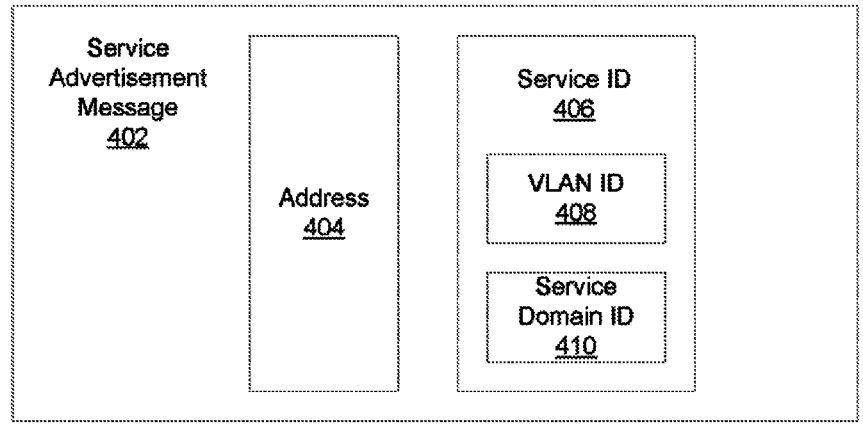
FIG. 4A is a diagram illustrating a service advertisement message according to an example embodiment.

FIG. 4A shows a service advertisement message 402 according to an example embodiment. The service advertisement message 402 may be sent by an advertising node 102 to a receiving node 106, according to an example embodiment. The service advertisement message 402 may be separate from data messages (not shown), and may allow the receiving node 106 to update its service map 110. The service advertisement message 402 may, for example, be included in an Ethernet frame. The service advertisement message 402 may be included in a data field of an Ethernet frame, or the service advertisement message 402 may be prepended as a header onto an Ethernet frame, as non-limiting examples.

The service advertisement message 402 may include an address field 404 and a service ID field 406. The address field 404 may include one or more addresses of the advertising node 102, such as a MAC address and/or an RPR address. The service ID field 406 may include service IDs for one or more services associated with the advertising node 102. The service ID field 406 may, for example, include a VLAN ID field 408 identifying one or more VLANs of which the advertising node 102 is a member. The service ID field 406 may additionally or alternatively include a service domain ID field 410 identifying one or more service domains for which the advertising node 102 is associated. The service advertisement message 402 may also include an addendum (not shown) which may include, for example, a vendor ID field. The vendor ID field may include a vendor ID which may typically match the vendor ID of other devices, which may confirm compatibility of devices (or devices from a same vendor), although this is not require.

Figure 4B:
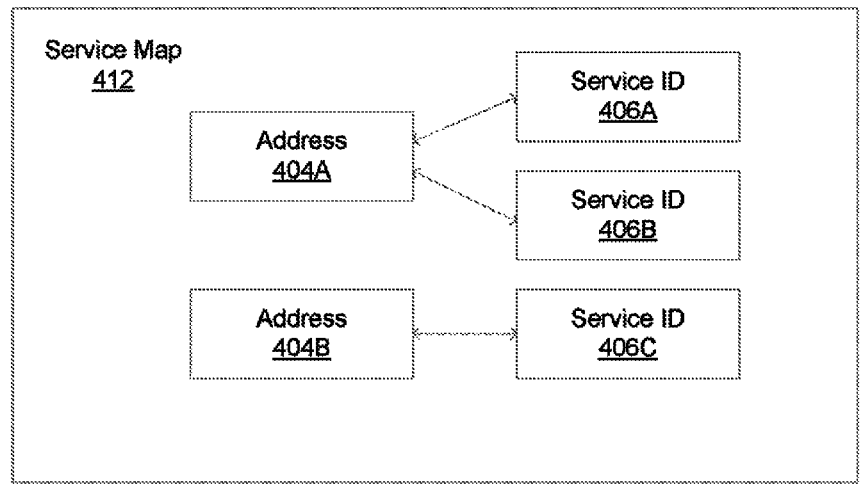
FIG. 4B is a diagram illustrating a service map according to an example embodiment.

FIG. 4B shows a service map 412 according to an example embodiment. The service map 412 may be determined by the receiving node 106 based on the received service advertisement message 402. The service map 412 may include one or more addresses 404A, 404B, and one or more service IDs 406A, 406B, 406C. Each address 404A, 404B may be associated with a different advertising node (e.g., an RPR MAC address of a different node). Each service ID 406A, 406B, 406C may be associated with an address 404A, 404B. For example, address 404A may be associated with service IDs 406A and 406B, while address 404B may be associated with service IDs 406C.

The service map 412 may be updated by the receiving node 106 (FIG. 1) based on receiving updated service advertisement messages 402. Thus, upon receipt of updated service advertisement messages 402, the receiving node 106 may add or delete addresses 404A, 404B and/or service IDs 406A, 406B, 406C to or from the service map 412, and/or may modify the address/service ID associations indicated by the service map 412.

Figure 5:
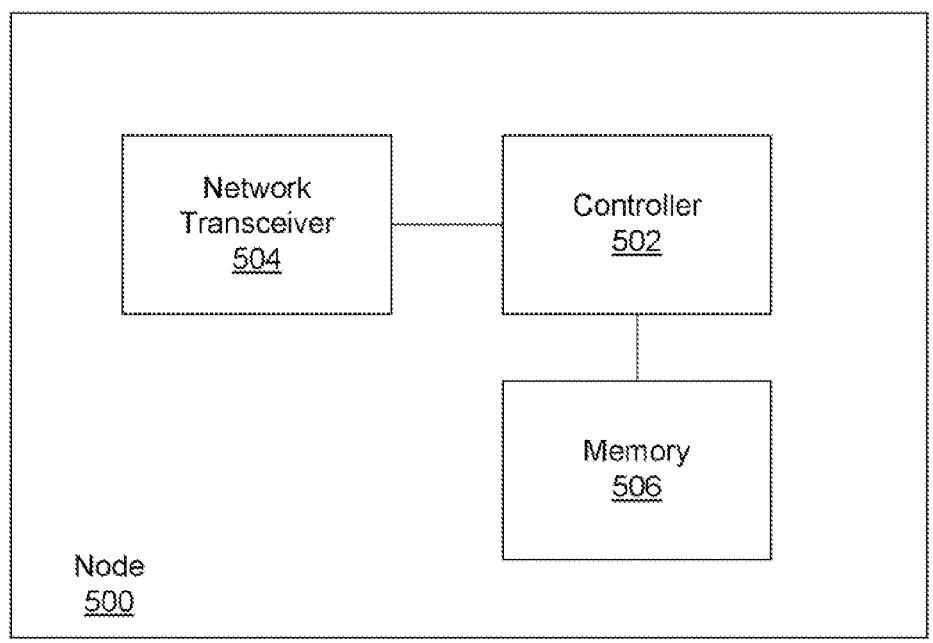
FIG. 5 is a block diagram of a node according to an example embodiment.

FIG. 5 shows a node 500 according to an example embodiment. The node 500 may include the receiving node 106, for example, and may include a controller 502. The controller 502 may be configured to receive a service advertisement message 104 from an advertising node 102, according to an example embodiment. The controller may also receive a plurality of service advertisement messages 104 from a plurality of nodes periodically, according to an example embodiment.

The node 500 may also include a network transceiver 504, which may receive the service advertisement message 104 from a network and route the service advertisement message 104 to the controller 502. The network may include a point-to-point broadcast media network or a ring-based network such as an RPR network, according to example embodiments. The network transceiver 504 may be coupled to the point-to-point broadcast media network such as a ring-based network, and to a first network.

The controller 502 may also be configured to determine, based on the received service advertisement message 104, a service map 110 indicating an association between an address of the advertising node 102 and one or more service IDs associated with the advertising node 102. The node 500 may include a memory 506, which may store the service map 110, according to an example embodiment.

The node 500 may also be configured to route data, such as in packet form, to the advertising node 102. For example, the controller 502 may be configured to receive a packet via a first network, such as an Ethernet network via an Ethernet switch 212, 214, 216, 218. The packet may include a first service ID. The controller 502 may be configured to determine that the first service ID of the received packet is associated with the address of the advertising node based on the service map 110. The controller 502 may be further configured to append a header to the received packet. The header may include the address of the advertising node 102 as a destination address. The controller 502 may transmit the packet with the appended header to the advertising node 102 via the network such as the point-to-point broadcast media network or ring-based network.

The node 500 may also be configured to route data, such as in packet form, from the advertising node 102. For example, the controller 502 may be configured to receive a packet from the advertising node 102 via the network such as the pointto-point broadcast media network or ring-based network. The received packet may include a header and a body including a service ID. The controller 502 may remove the header from the received packet, and transmit the received packet, including the service ID, via a first network, such as via an Ethernet switch 212, 214, 216, 218.

Figure 6:
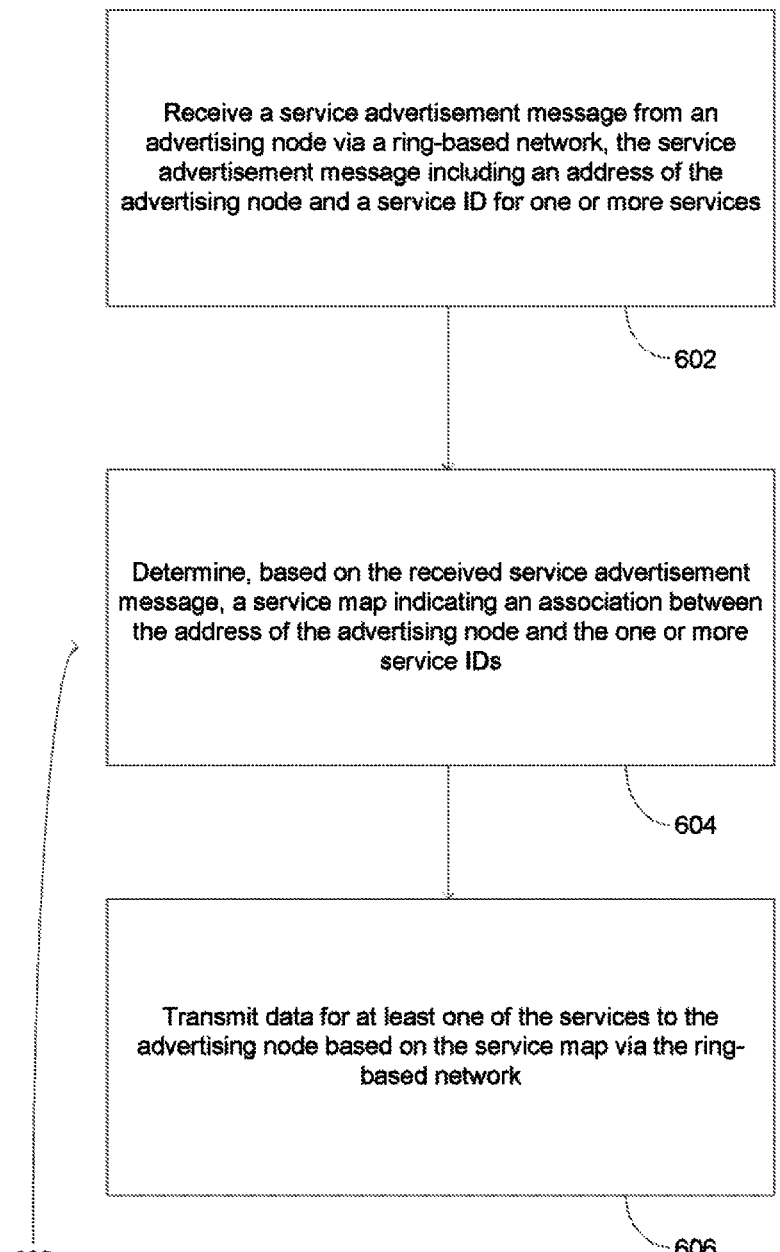
FIG. 6 is a flow chart illustrating operation of a node according to an example embodiment.

FIG. 6 shows a method 600 according to an example embodiment. The method 600 may include receiving a service advertisement message 104 from an advertising node 102 via a ring-based network. The receiving may include receiving a service advertisement message 104 from each of a plurality of advertising nodes via the ring-based network. The service advertisement message 104 may include an address of the advertising node 102 and a service ID for one or more services (602). The service ID may include a VLAN ID identifying a VLAN of which the advertising node 102 is a member, and/or a service domain ID.

The method 600 may further include determining, based on the received service advertisement message 104, a service map 110 indicating an association between the address of the advertising node 102 and the one or more service IDs (604). The service map 110 may indicate an association between a ring-based network address and one or more VLANs of which the advertising node 102 is a member. The method may further include transmitting data for at least one of the services to the advertising node 102 based on the service map 110 via the ring-based network (606).

The method 600 may also include receiving an updated service advertisement message 310 from a standby node 304, and determining an updated service map 312 indicating an updated association between the address of the standby node 304 and the one or more service IDs based on the received updated service advertisement message 310.

In another example, the receiving (602) may include receiving a service advertisement message 310 from the service advertising node 302, the service advertisement message 310 including an address of the service advertising node 302 and a first service ID. The receiving (602) may also include receiving a second advertisement message 310 from the standby node 304, the second advertisement message 310 including an address of the standby node 304 and the first service ID. The determining (604) may include determining a service map 312 indicating an association between the address of the service advertising node 302 and the first service ID based on the first service advertisement message 310, and determining an updated service map 312 indicating an association between the address of the standby node 304 and the first service ID based on the second advertisement message 310.

The method 600 may also include updating the service map 110 based on subsequent received service advertisement messages 104. For example, the receiving (602) may include receiving a first service advertisement message 104 from the advertising node 102, the first service advertisement message 104 including the address of the advertising node 102 and a first service ID and a second service ID, and receiving a second service advertisement message 104 from the advertising node 102, the second advertising message 104 including the address of the advertising node 102 and only the first service ID. The determining (604) may include determining, based on the first service advertisement message 104, a service map 110 indicating an association between the address of the advertising node 102 and the first service ID and the second service ID, and determining, based on the second service advertisement message 104, an updated service map 110 indicating an association between the address of the advertising node 102 and the first service ID, and deleting the second service ID from the service map 110 as being associated with the address of the advertising node 102 based on the second service advertisement message 104.

According to another example, the receiving (602) may include receiving a first service advertisement message 104 from the advertising node 102, the first service advertisement message 104 including the address of the advertising node 102 and a first service ID, and receiving a second service advertisement message 104 from the advertising node 102, the second service advertisement message 104 including the address of the advertising node 102 and the first service ID and a second service ID. The determining (604) may include determining, based on the first advertisement message 104, a service map 110 indicating an association between the address of the advertising node 102 and the first service ID, and determining, based on the second service advertisement message 104, an updated service map 110 indicating an association between the address of the advertising node 102 and the first service ID and the second service ID.

According to an example embodiment, the transmitting (606) may include receiving a packet via a first network. The packet may include a first service ID. The transmitting (606) may also include determining, based on the service map 110, that the first service ID of the received packet is associated with the address of the advertising node 102. The transmitting (606) may also include appending a header to the received packet, the header including the address of the advertising node 102 as a destination address. The transmitting (606) may also include transmitting the packet with the appended header to the advertising node via the ring-based network.

Figure 7:
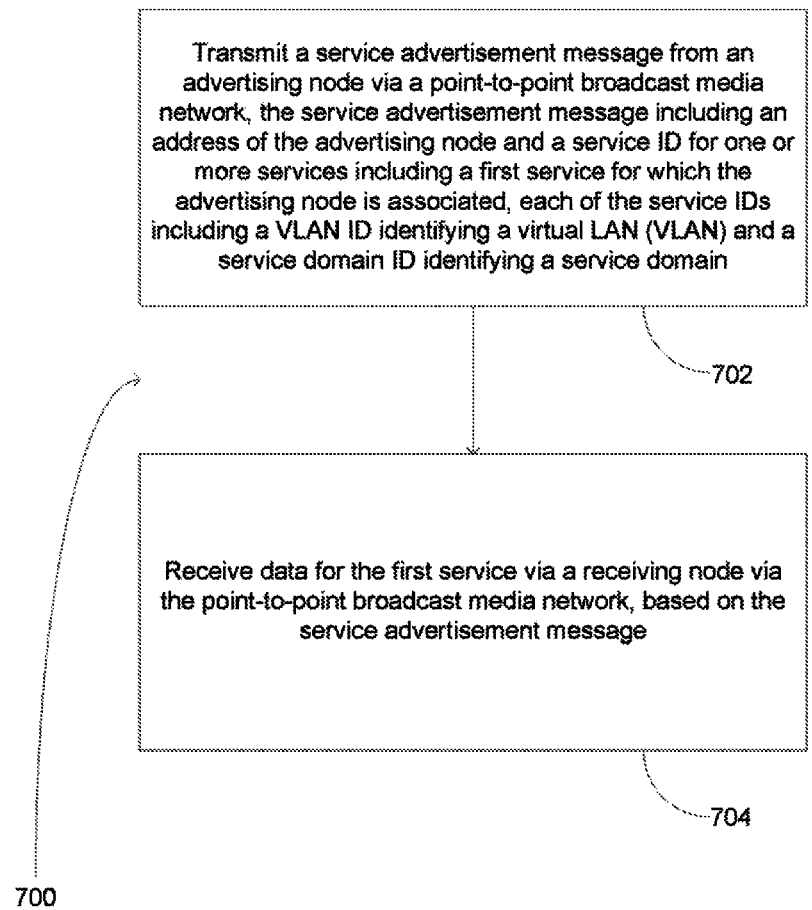
FIG. 7 is a flow chart illustrating operation of a node according to another example embodiment.

FIG. 7 shows another method 700 according to another example embodiment. In this example, the method 700 may include transmitting a service advertisement message 104 from an advertising node 102 via a point-to-point broadcast media network (702). The service advertisement message 104 may include an address of the advertising node 102 and a service ID for one or more services including a first service with which the advertising node 102 is associated. Each of the service IDs may include a VLAN ID identifying a virtual LAN (VLAN) and a service domain ID identifying a service domain.

The method 700 may also include receiving data for the first service via a receiving node 106 via the point-to-point broadcast media network 100, based on the service advertisement message 104 (704). In an example embodiment, the transmitting (702) may include periodically transmitting an updated service advertisement message 104 to one or more nodes 106 coupled to the point-to-point broadcast media network 100. The updated service advertisement message 104 may include an updated list of one or more service IDs that identify services for which the advertising node 102 is a member or is associated with.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A method comprising:
    receiving, by a receiving node, a first service advertisement message in an Ethernet frame sent from an advertising node via a ring-based network, the first service advertisement message including a Media Access Control (MAC) address of the advertising node and a first service identifier (ID) for one or more services, the advertising node being coupled to a switch outside the ring-based network, wherein the one or more services include one or more virtual local area network (VLAN) memberships supported by one or more ports on the switch;
    determining, by the receiving node based on the first service advertisement message, a service map indicating an association between the MAC address of the advertising node and the first service ID for the one or more services;
    transmitting, by the receiving node, data for at least one of the services to the switch via the advertising node based on the service map via the ring-based network;
    receiving, by the receiving node from a standby node, a second service advertisement message, the second service advertisement message including a MAC address of the standby node and the first service ID, the standby node being coupled to the switch, wherein receiving comprises periodically receiving the first and second service advertisement messages that include a service domain ID that is configured to identify a partition in the ring-based network such that VLAN membership IDs can be reused among service domains; and
    updating, by the receiving node based on the second service advertisement message, the service map by adding the MAC address of the standby node to indicate the standby node is associated with the first service ID.

2. The method of claim 1, wherein the receiving comprises receiving the first service advertisement message including one or more VLAN membership IDs associated with the one or more services, and wherein the first service ID is embedded in a body of the Ethernet frame.

3. The method of claim 1, wherein the receiving comprises receiving a service advertisement message from each of a plurality of advertising nodes via the ring-based network, each of the service advertisement messages including a MAC address of a corresponding advertising node and a service ID for one or more services, the advertising node being associated with the one or more services;
    wherein the determining comprises determining, based on the received service advertisement messages, a service map indicating an association between the MAC address and the one or more service IDs for each of the advertising nodes.

4. The method of claim 1, wherein the service map indicates an association between a ring-based network MAC address and one or more VLANs, the advertising node being a member of the one or more VLANs.

5. The method of claim 1, wherein:
    receiving the first service advertisement message comprises receiving the first service advertisement message from the advertising node, the first service advertisement message including the MAC address of the advertising node and the first service ID and a second service ID; and
    determining the service map comprises determining, based on the first service advertisement message, the service map indicating an association between the MAC address of the advertising node and the first service ID and the second service ID;
    wherein the method further comprises:
        receiving an updated service advertisement message by the receiving node from the advertising node, the updated service advertisement message including the MAC address of the advertising node and only the first service ID; and
        determining, by the receiving node based on the updated service advertisement message, an updated service map indicating an association between the MAC address of the advertising node and the first service ID, and deleting the second service ID from the service map as being associated with the MAC address of the advertising node based on the updated service advertisement message.

6. The method of claim 1, wherein transmitting comprises:
receiving a packet via a first network, the packet including the first service ID;
determining, based on the service map, the first service ID of the received packet is associated with the MAC address of the advertising node;
appending a header to the received packet, the header including the MAC address of the advertising node as a destination MAC address; and
transmitting the packet with the appended header to the advertising node via the ring-based network.

7. The method of claim 1, wherein the receiving node receives the second advertisement message based on the advertising node ceasing to send a heartbeat to the standby node, and the method further comprising receiving, by the receiving node, data communication for at least one port of the one or more ports on the switch from the standby node based on the second advertisement message.

8. An apparatus comprising:
at least one processor; and
at least one memory device, the at least one memory device comprising computer-readable code, when executed by the at least one processor, is configured to cause the apparatus to:
receive an Ethernet frame having a first service advertisement message from an advertising node via a point-to-point broadcast media network including a ring-based network, the first service advertisement message including a Media Access Control (MAC) address of the advertising node and a service identifier (ID) for one or more services, the advertising node being coupled to a switch outside the point-to-point broadcast media network, wherein the one or more services include one or more virtual local area network (VLAN) memberships supported by one or more ports on the switch;
determine, based on the first received service advertisement message, a service map indicating an association between the MAC address of the advertising node and the service for the one or more services;
receive a second service advertisement message from a standby node, the second service advertisement message including a MAC address of the standby node and the service ID, the standby node being coupled to the switch, wherein the at least one processor and at least one memory device are configured to cause the apparatus to periodically receive service advertisement messages from a plurality of nodes coupled to the point-to-point broadcast media network, wherein each of the service advertisement messages includes a service domain ID that is configured to identify a partition in the ring-based network such that VLAN membership IDs can be reused among service domains; and
update, based on the second service advertisement message, the service map by adding the MAC address of the standby node to indicate the standby node is associated with the first service ID.

9. The apparatus of claim 8, wherein the at least one processor and at least one memory device are further configured to cause the apparatus to:
receive a packet via a first network, the packet including a first service ID;
determine, based on the service map, the first service ID of the received packet is associated with the MAC address of the advertising node;
append a header to the received packet, the header including the MAC address of the advertising node as a destination MAC address; and
transmit the packet with the appended header to the advertising node via the point-to-point broadcast media network.

10. The apparatus of claim 8, wherein the at least one processor and at least one memory device are further configured to cause the apparatus to:
receive a packet from the advertising node via the point-to-point broadcast media network, the received packet including a header and a body including a service ID;
remove the header from the received packet; and
transmit the received packet, including the service ID, via a first network which is outside the point-to-point broadcast media network via the switch.

11. The apparatus of claim 8, wherein the apparatus comprises a network transceiver, the network transceiver coupled to the point-to-point broadcast media network and a first network, wherein the ring-based network comprises a resilient packet ring network.

12. The apparatus of claim 8, wherein the apparatus comprises a network transceiver coupled to the point-to-point broadcast media network.

13. The apparatus of claim 8, wherein the at least one processor and at least one memory device are configured to cause the apparatus to receive the second advertisement message based on a failure of at least one port on the advertising node.

14. The apparatus of claim 11, wherein the at least one processor and at least one memory device are configured to cause the apparatus to receive the second advertisement message based on the advertising node ceasing to send a heartbeat to the standby node, and wherein the at least one processor is further configured to cause the apparatus to receive data communication for at least one port of the one or more ports on the switch from the standby node based on the second advertisement message.

15. A non-transitory computer-readable media comprising computer-readable instructions that, when executed, are configured to cause an apparatus to:
periodically receive a first service advertisement message in an Ethernet frame sent from an advertising node via a ring-based network, the service advertisement message including a Media Access Control (MAC) address of the advertising node and a service identifier (ID) for one or more services, the advertising node being coupled to a switch outside the ring-based network, wherein the one or more services include one or more virtual local area network (VLAN) memberships supported by one or more ports on the switch;
determine, based on the first received service advertisement message, a service map indicating an association between the MAC address of the advertising node and the service ID for the one or more services;
periodically receive a second service advertisement message from a standby node, the second service advertisement message including a MAC address of the standby node and the service ID, the standby node being coupled to a switch outside the ring-based network, wherein the first and second service advertisement messages include a service domain ID that is configured to identify a partition in the ring-based network such that VLAN membership IDs can be reused among service domains; and update, based on the second service advertisement message, the service map indicating an association between the MAC address of the standby node and the first service ID.

16. The method of claim 1, wherein the advertising node and the standby node form a port protection group in order to provide port redundancy on the ring-based network for the one or more ports on the switch, and wherein the receiving node receives the second advertisement message based on the advertising node becoming disabled or otherwise receives the second advertisement message periodically.

17. The non-transitory computer-readable media of claim 15, wherein the instructions are configured to cause the apparatus to receive the second advertisement message based on a failure of at least one port on the advertising node.

18. The non-transitory computer-readable media of claim 15, wherein the instructions are configured to cause the apparatus to receive the second advertisement message based on the advertising node ceasing to send a heartbeat to the standby node, and further comprising instructions are configured to cause the apparatus to receive data communication for at least one port of the one or more ports on the switch from the standby node based on the second advertisement message.

* * * * *